United States Patent [19]

Hartmeyer

[11] Patent Number: 4,988,119
[45] Date of Patent: Jan. 29, 1991

[54] VEHICLE OCCUPANT RESTRAINT SYSTEM

[75] Inventor: James Hartmeyer, St. Clair Shores, Mich.

[73] Assignee: Irvin Automotive Products, Inc., Auburn Hills, Mich.

[21] Appl. No.: 392,642

[22] Filed: Aug. 11, 1989

Related U.S. Application Data

[63] Continuation-in-part of Ser. No. 257,971, Oct. 14, 1988, abandoned.

[51] Int. Cl.⁵ .............................................. B60R 21/16
[52] U.S. Cl. .................................... 280/743; 141/313; 383/3
[58] Field of Search ............... 280/728, 729, 741, 743; 383/3; 141/313, 314

[56] References Cited

U.S. PATENT DOCUMENTS

| | | | |
|---|---|---|---|
| 3,810,654 | 5/1974 | DeBano, Jr. et al. | 280/743 |
| 3,888,504 | 6/1975 | Bonn et al. | 280/743 |
| 3,900,210 | 8/1975 | Lohr et al. | 280/729 |
| 4,173,356 | 11/1979 | Ross | 280/743 |
| 4,183,550 | 1/1980 | Sudov | 280/743 |
| 4,235,453 | 11/1980 | Lawson et al. | 280/743 |
| 4,793,631 | 12/1988 | Takada | 280/743 |
| 4,805,930 | 2/1989 | Takada | 280/728 |
| 4,828,286 | 5/1989 | Fohl | 280/731 |
| 4,830,401 | 5/1989 | Honda | 280/736 |

Primary Examiner—Richard A. Bertsch
Attorney, Agent, or Firm—Harness, Dickey & Pierce

[57] ABSTRACT

An air bag occupant protection device for use in motor vehicles having an air bag made from a single piece of flat foldable fabric material. The air bag according to this invention is formed by gathering the free edge of a flat piece of sheet stock to define radial pleats at a small opening provided for inflation gases to enter the inside of the bag. Various approaches for gathering the free edge of the material are disclosed including the use of a retaining ring having posts which engage apertures in the free edge of the material, a cord for gathering the free edge, and various other means of gathering the edge and sewing it in place. The invention avoids the cost of fabricating an air bag from multiple pieces of cut fabric and further avoids the failure modes of a fabricated air bag caused by the presence of seams which can constitute a local weakness in the air bag assembly.

64 Claims, 7 Drawing Sheets

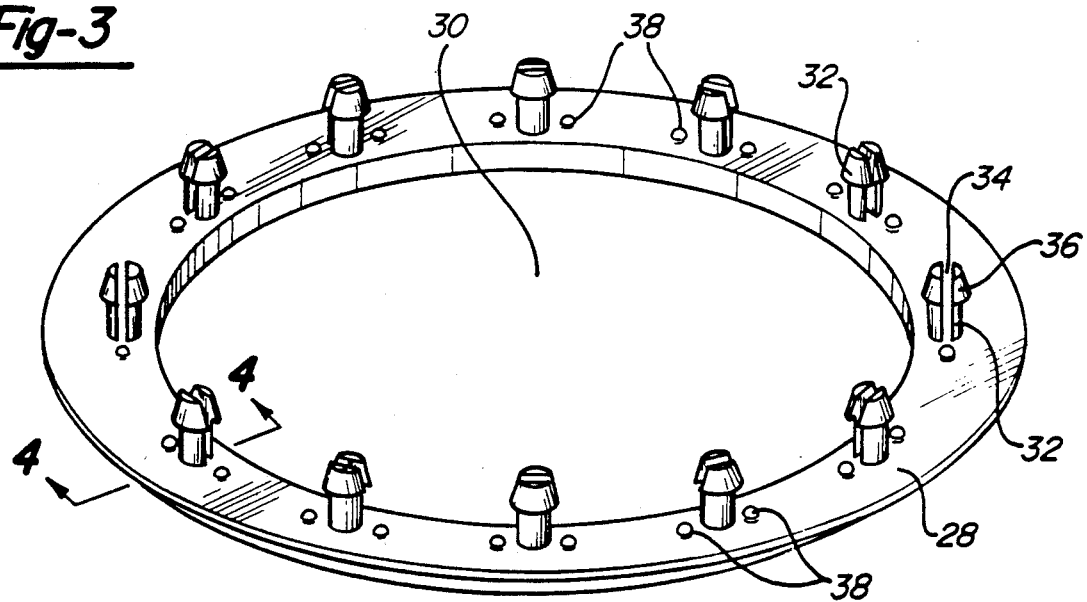
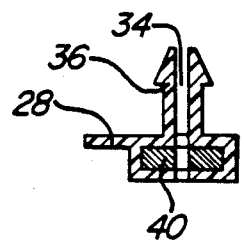
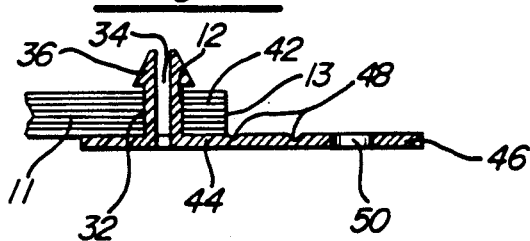 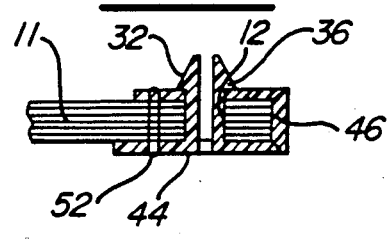
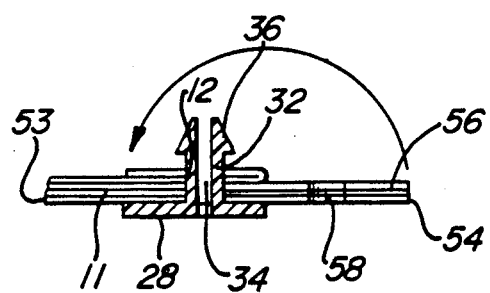 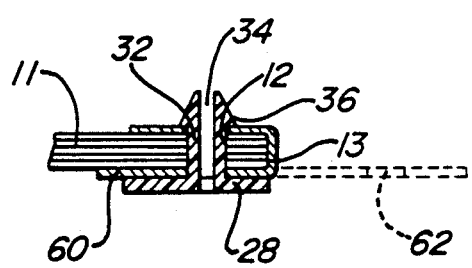

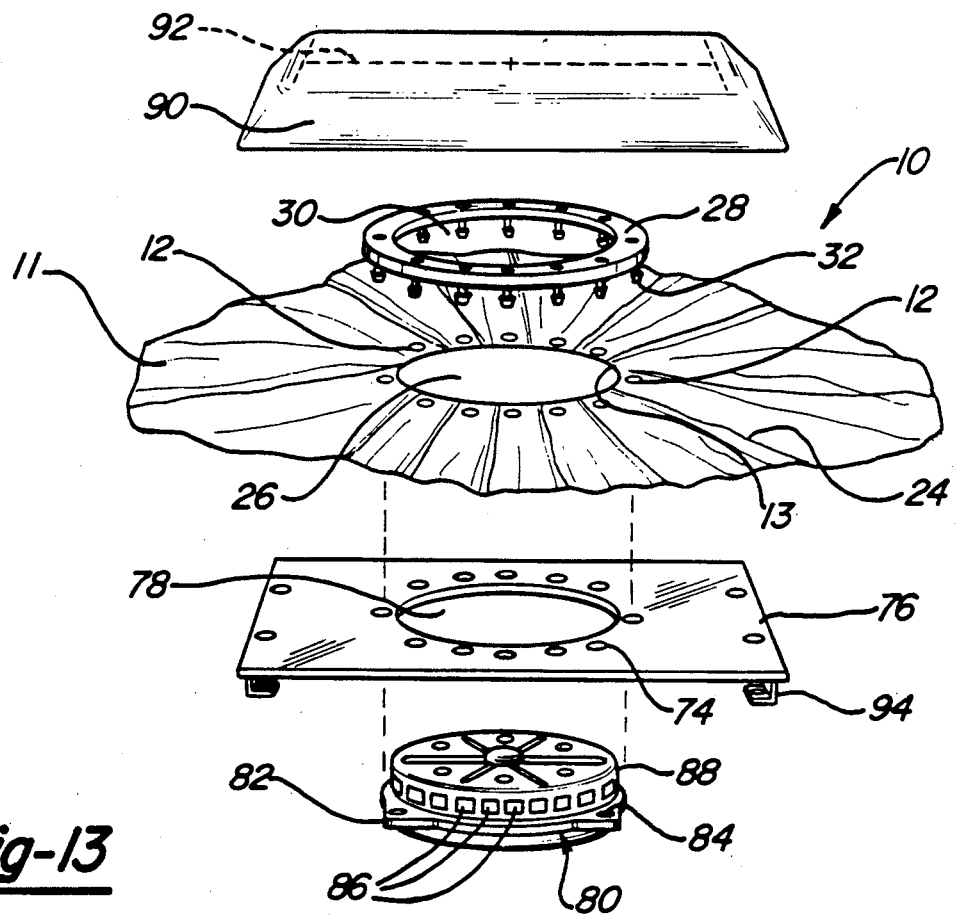
_Fig-13_
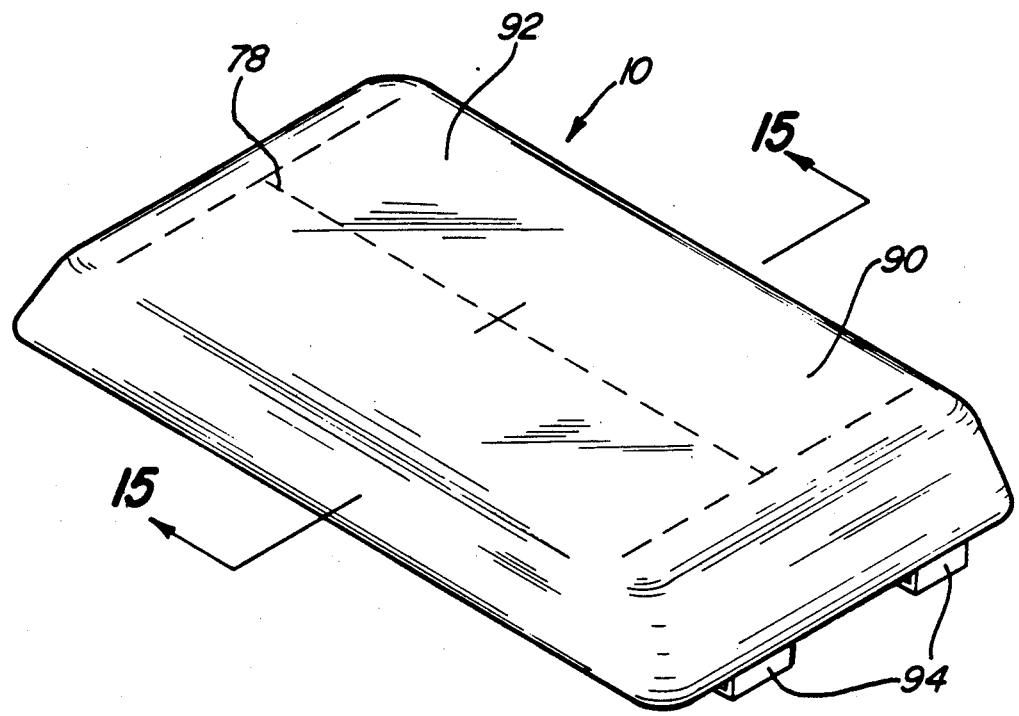
_Fig-14_

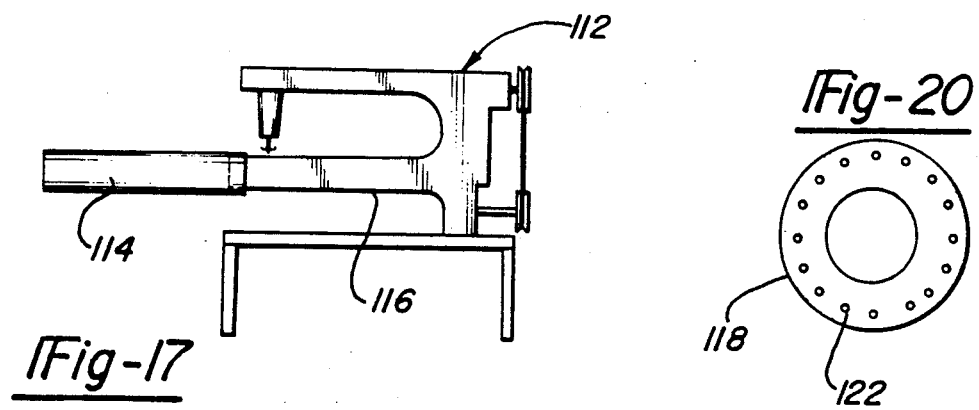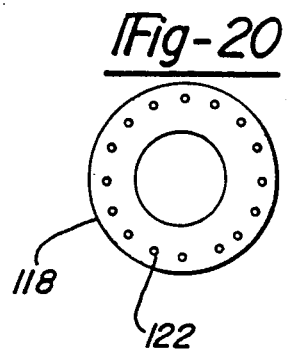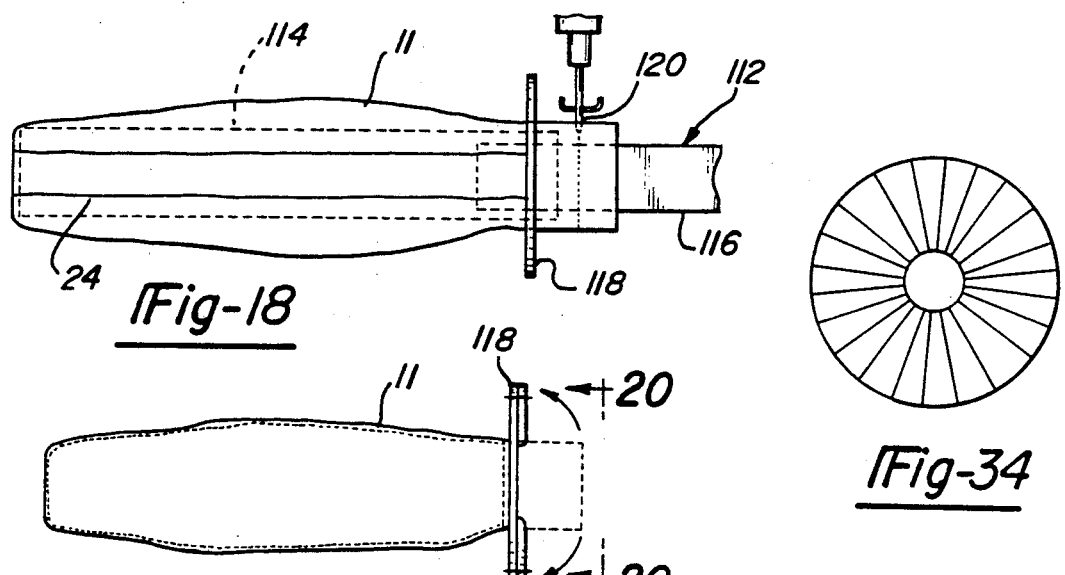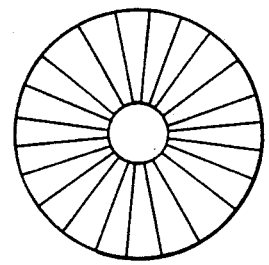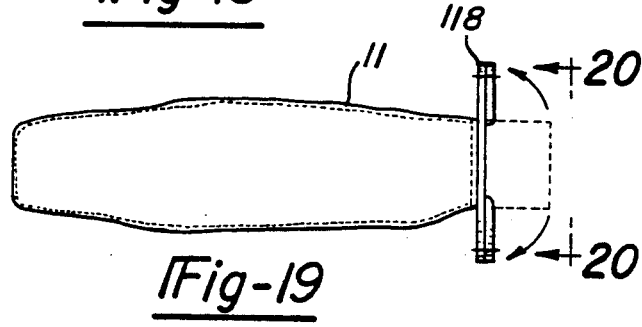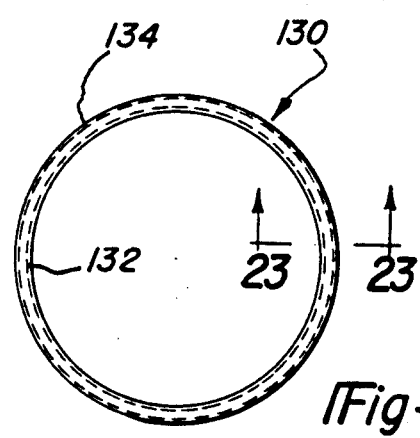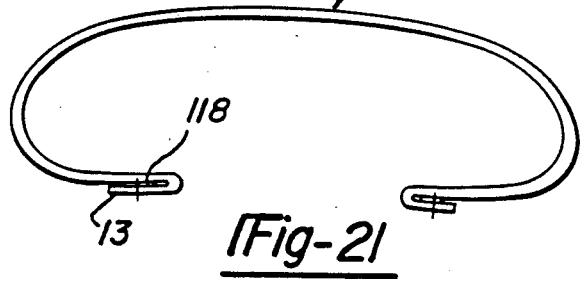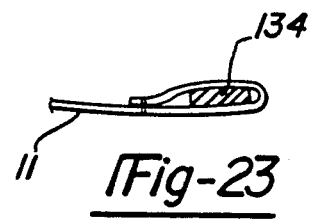

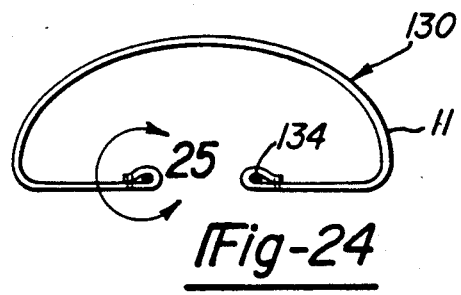
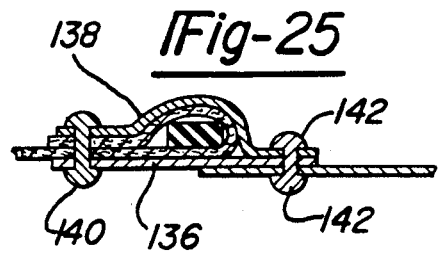
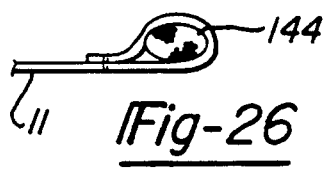
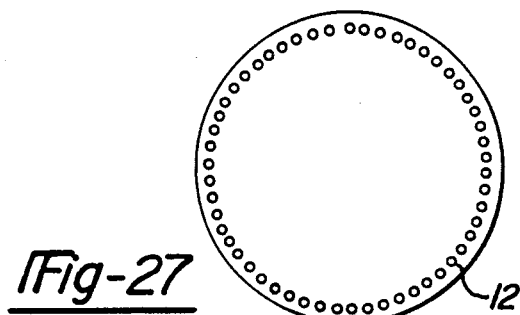
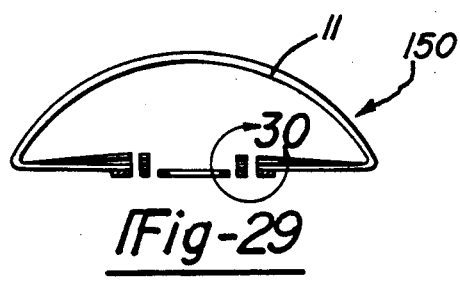
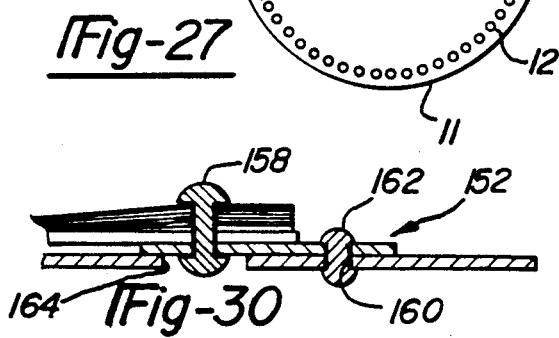
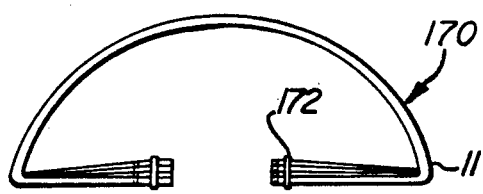
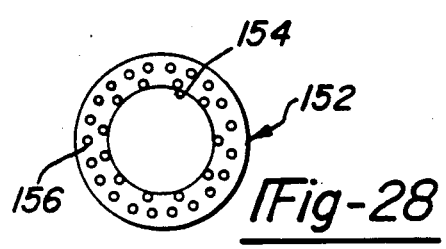
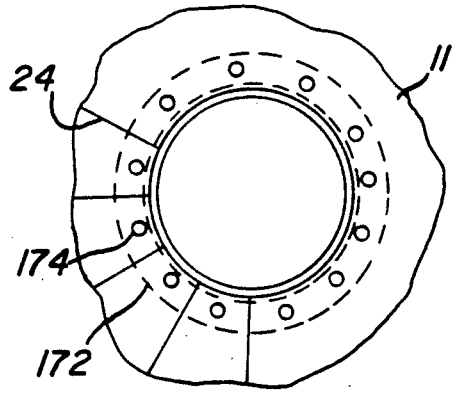
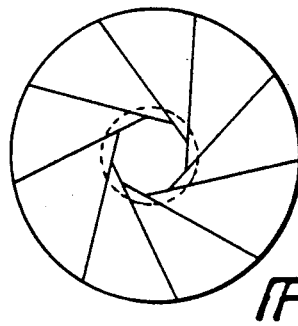

VEHICLE OCCUPANT RESTRAINT SYSTEM

CROSS-REFERENCE TO RELATED APPLICATION

This application is a continuation-in-part of copending Application Ser. No. 257,971, filed Oct. 14, 1988, entitled "Vehicle Passenger Safety Device, And Methods Of Construction And Utilizing Same", by the present applicant, now abandoned.

BACKGROUND AND SUMMARY OF THE INVENTION

This invention relates to vehicle occupant restraint systems and more particularly to automatically inflatable, seamless bags for use with impact-actuated vehicle occupant restraint systems.

Impact-actuated inflatable occupant restraint systems typically comprise a source of non-combustible inflating gas and a folded inflatable air bag. Detectors sense deceleration of the vehicle due to impact and actuate a source of inflating gas. The gases inflate the folded air bag to provide a resilient restraint for absorbing the kinetic energy of the occupant's body.

Most previous inflatable air bags have been constructed from multiple sheets of fabric stock which are seamed together. Typically two flat sheets of flexible material are arranged to form a top sheet and a bottom sheet. The sheets are joined at a seam along their respective edges to form a closed compartment. An opening to communicate with the gas source is formed either in the seam or in one of the sheets. Alternatively, the prior art teaches that a patterned single flat sheet may be first folded so that its edges overlie one another and then joined at these edges. In either approach, a seam has been created.

Several disadvantages result from constructing an air bag using such seams. All seams, whether sewn, dielectric, sonic or adhesive in nature, present a potential point of failure of the bag. A seam does not provide the continuity of strength, stretchability and flexibility of a continuous sheet of material. A seam also presents opportunity for air leakage which adversely affects the designed control of air flow. A sewn seam can fail due to a dropped stitch, weak thread, improper alignment of material or stitches, thread deterioration, a broken needle or material weakened due to manufacturing techniques. Any seam may fail during use due to the pressures and heat associated with gas generation and rapid inflation. Seams must be inspected for these potential problems. This testing or inspection can also weaken the seam. Finally, many of these potential problems of a seam are unobvious and an inspection may overlook the potential failure point.

An alternative prior art construction utilizes molded air bags or air bags made of formable material. However, such air bags are costly to manufacture and inspect, and they may fail due to undetectable weaknesses.

The present invention provides a reliable and inexpensive inflatable air bag for use with vehicle occupant restraint systems Broadly, the inflatable air bag of the present invention is constructed of a single piece of flat, flexible sheet material, which may be circular or of another shape. The sheet is substantially larger, in all cross-dimensions than the outlet or nozzle of the inflating gas generator with which the bag is associated. The free edge of the sheet is gathered and attached about the outlet of the gas inflator and forms a seal between the bag and the outlet, thereby forming a series of radial pleats in the sheet material. One preferred manner of attachment, which will be disclosed in detail in the following description of the preferred embodiment of the invention, utilizes a number of apertures spaced about the free edge of the sheet and fixed over a smaller number of studs or posts extending parallel to one another at regular intervals around a retaining ring. Each stud extends through a number of apertures in the sheet thereby gathering the edge so as to form radial pleats. By way of example, the bag may have 60 holes formed about its perimeter and these holes may be arranged over 20 studs formed on the ring with three adjacent holes gathered over each stud. The radial pleats thereby formed have a maximum width at the free edge, and decrease in width as they extend outwardly toward the center of the sheet. The studs of the retaining ring engage additional support structures to secure the sheet material about the outlet of the gas-generating apparatus in a relatively gas impervious manner. Various other approaches for gathering the material around the gas outlet are described herein.

To control the inflated bag to assume a relatively elliptical shape, elongated tethers may be provided with one end secured to the interior surface of the sheet material. The other end of a tether is then anchored to a stud on said retaining ring to control the shape of the bag on inflation. The bag is thus restrained from achieving a spherical shape during inflation.

Additionally, exhaust holes within the bag may be utilized. The exhaust hole or holes provide a release for excess inflation gas and allow for deflation of the air bag after use.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 is a perspective view of the retaining ring in accordance with a first embodiment of the invention.

FIG. 4 is a sectional view of the retaining ring and one protruding stud taken along line 4-4 in FIG. 3.

FIG. 6 is a sectional view of a single stud of a second embodiment of a retaining ring having a material end protection strip and showing the strip before it is secured in place.

FIG. 7 illustrates the end protection strip of FIG. 6 after closing.

FIG. 8 is a sectional view of a single stud of a third embodiment of a retaining ring which uses an extension of the air bag material for providing protection for the material edge.

FIG. 9 is a sectional view of a single stud of a fourth embodiment of a retaining ring having a separate strip of material for providing protection for the material edge.

FIG. 13 is an exploded view of the preferred embodiment of the invention.

FIG. 14 is a perspective view of an air bag housing in a stored condition.

FIG. 17 is a perspective view of a sewing machine used to form an air bag in accordance with this invention.

FIG. 18 is an enlarged perspective view showing in greater detail the sewing operation of an air bag according to an alternate embodiment of this invention.

FIG. 19 is a perspective view similar to FIG. 18 but showing the gathered end of the air bag material being flared out and attached to a sewing ring.

FIG. 20 is a plan view of the sewing ring used in conjunction with the embodiment shown in FIGS. 18 and 19.

FIG. 21 is a cross-sectional view taken through an air bag of the type shown in FIGS. 17 through 20 shown in an inflated condition.

FIG. 22 is a plan view of an air bag in accordance with another alternate embodiment of this invention using a gathering cord.

FIG. 23 is a cross-sectional view taken along line 23—23 from FIG. 2 showing in cross-section the elastic gathering band used in this embodiment.

FIG. 24 is a cross-sectional view of the air bag shown in FIGS. 22 and 23 in an inflated condition.

FIG. 25 is a cross-sectional view taken from FIG. 24 showing in detail a means for clamping the air bag of FIG. 24 to an associated support structure.

FIG. 26 is a cross-sectional view of an air bag according to an alternate construction of the device shown in FIGS. 22 through 25 except using an inelastic gathering cord.

FIG. 27 is a plan view of fabric for an air bag according to an alternate embodiment of this invention.

FIG. 28 is a plan view of a air bag retaining ring according to an alternate embodiment of this invention.

FIG. 29 is a cross-sectional view taken through an air bag utilizing the components shown in FIGS. 27 and 28 in an inflated condition.

FIG. 30 is a cross-sectional view taken from FIG. 29 showing the manner of attachment of the air bag of that figure to an associated support structure.

FIG. 31 is a cross-sectional view taken through another alternate embodiment of an air bag according to this invention shown in an inflated condition utilizing staples to gather the free edge of material.

FIG. 32 is a partial view of the embodiment shown in FIG. 1 showing staples restraining the gathered edge of the material and further showing pierced holes within the fabric to facilitate mounting of the air bag to an associated support structure.

FIG. 33 is a plan view of an air bag in accordance with this invention gathered to provide a relatively small number of radial pleats in the bag extending from the gathered edge of the material.

FIG. 34 is a plan view of an air bag according to this invention providing a relatively larger number of radial pleats as compared to FIG. 33.

DETAILED DESCRIPTION OF THE PREFERRED EMBODIMENTS

Figure 1:
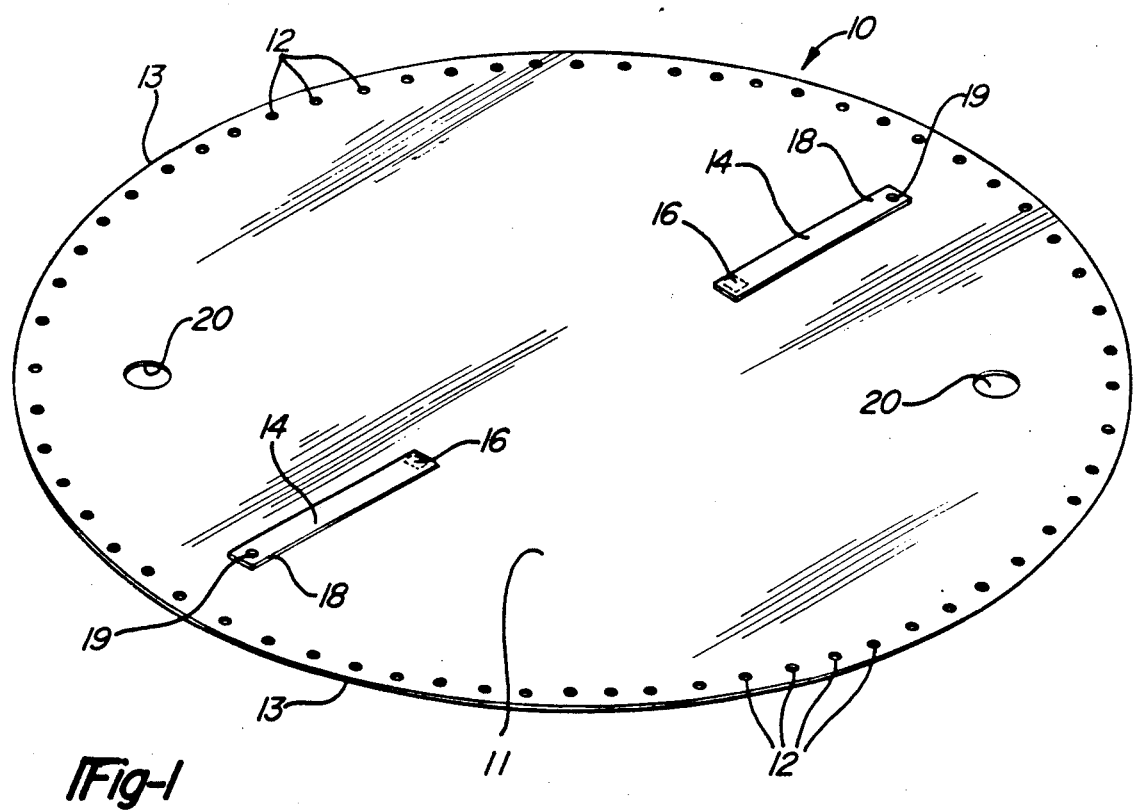
FIG. 1 is a perspective view of the interior face of a single sheet of material used to form a first embodiment of the air bag of the present invention.

A preferred embodiment of the air bag of the present invention is formed from a circular blank 11 of a flat sheet of material and is generally designated by reference numeral 10. The blank 11 has a substantially greater diameter than the major cross-sectional dimension of the outlet or nozzle of the gas generator with which the bag is used as will be subsequently described. Circular blank 11 is shown laid out flat in FIG. 1 with the inner surface of the air bag visible. A plurality of apertures 12 are disposed around the perimeter of the blank 11 proximate the perimeter edge 13.

A pair of optional tethers 14 are disposed on the upper (inner) surface of circular blank 11. In use, the tethers 14 are attached to the central region of blank 11 at tether end 16. The opposite tether end 18 containing tether aperture 19 is unattached to the bag itself. A more precise explanation of tethers 14 will be disclosed hereinafter.

Blank 11 is preferably made from a substantially gas impervious material. In the preferred embodiment, blank 11 is composed of an outside layer of woven nylon fabric, which provides strength and durability, with an inside coating of heat resistant material, such as neoprene to protect the nylon fabric from the heat associated with gas generation.

Depending on the application, various degrees of permeability of the material to the inflation gases are selected. It is desired, however, to allow the bag to deflate after actuation. Such controlled leakage of gas can be provided by the selection of material for its permeability or through the use of vent or exhaust holes in the bag. As shown in FIG. 1, exhaust holes 20 are provided in the blank 11 to allow the controlled escape of gas. These exhaust holes 20 are used for an air bag made from a relatively gas impervious material and provides sufficient post-accident ventilation of the interior volume while retaining the capacity of the air bag to restrain the occupant during impact. In addition, the exhaust holes 20 cushion the impact of the occupant on the air bag in use by allowing the escape of gas when the additional pressure of an occupant is exerted. Thus, the air bag cushions the occupant but does not remain inflated for an extended period.

Figure 2:
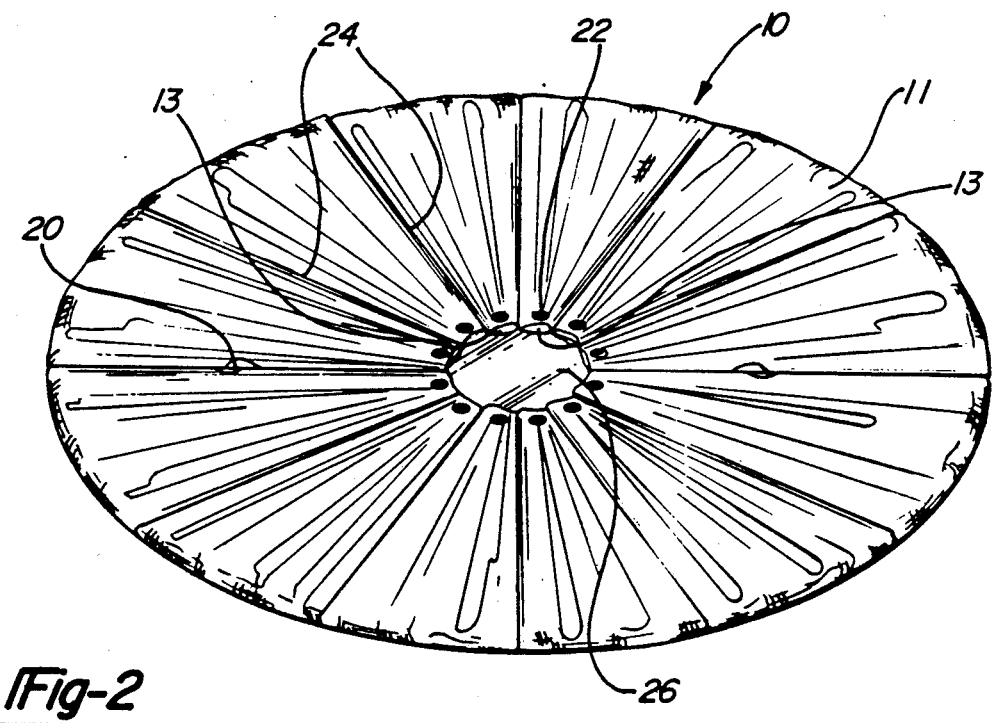
FIG. 2 is a perspective view of the air bag made from the sheet of FIG. 1 laid out in a planar manner after the free edge of the sheet material has been gathered.

As illustrated in FIG. 2, the free edge 13 of the blank 11 is gathered together to define a central air bag opening 26. The scale of FIG. 2 is enlarged as compared with FIG. 1. In practice, the diameter of the finished bag laid flat as shown in FIG. 2 would be roughly one-third of that of the blank 11. Various methods can be employed to gather and restrain the material to form opening 26. In the embodiment shown in FIG. 2, a plurality of grommets 22 passing through apertures 12 are used to gather the material. Each grommet 22 is introduced through a predetermined number of adjacent apertures 12. For example, assuming a total of one hundred apertures 12, every five adjacent apertures can be folded to be in alignment similar to that shown in FIG. 2. This will allow a single grommet 22 to pass through and secure five aligned adjacent apertures 12. This example (not shown) would use twenty grommets 22. The gathering results in radial pleats 24 extending outward from the opening 26 shown in FIG. 2. As further shown in FIG. 2, exhaust outlets 20 are partially exposed in pleats 24 and do not inhibit the shaping, folding and storing of the overall air bag assembly.

The air bag assembly 10 shown in FIG. 2 can be attached to an associated vehicle or an inflater assembly using various means. For example, posts or studs can be placed through grommets 22 to secure the air bag. Following are descriptions of various embodiments of means for fastening air bag 10 to an associated structure.

The free edge 13 of the bag is secured to the molded plastic retaining ring 28 according to a first embodiment design as illustrated in FIG. 3. The retaining ring 28 defines retainer opening 30 which generally corresponds in shape and size to air bag opening 26. A plurality of studs 32 are disposed about the air bag opening 26 and project perpendicularly away from a radial face of retaining ring 28. Each stud has a major axis perpendicular to the planar face of retaining ring 28 and a longitudinal slot 34 effectively splitting the stud into two sections. The plane of longitudinal slot 34 includes the slot's major axis. Shoulder sections 36 are disposed about the free ends of studs 32. The slots 34 allow each stud 32 to compress allowing shoulder sections 36 to pass through an aperture 12 in blank 11. Thereafter, studs 32 spring back and shoulder sections 36 provide resistance opposing the removal of retaining ring 28 from blank 11.

The various embodiments of retaining rings shown in FIGS. 3 through 13 are not used with grommets 22. Rather, the apertures are left with a free edge of material. Grommets 22 could, however, be used to reinforce apertures 12, if desired.

Figure 5:
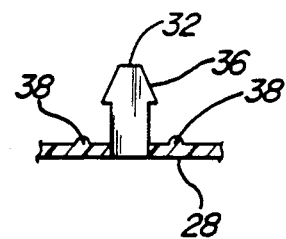
FIG. 5 is a sectional view of a single stud of the retaining ring shown in FIG. 3.
Figure 11:
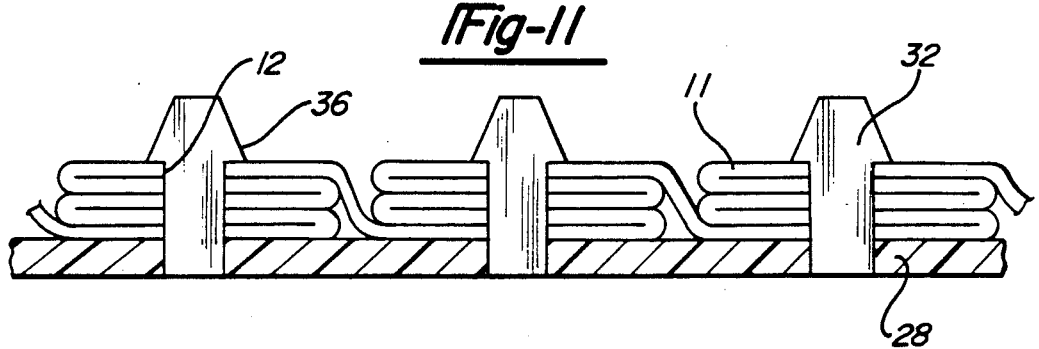
FIG. 11 is an enlarged view of a series of studs showing the relative configuration of the flat sheet material as gathered about the studs in accordance with an exemplary folding pattern.

In the embodiment of retaining ring 28 shown in FIG. 3, protrusions 38 are disposed between studs 32 to bear upon the folded free edge 13. These protrusions 38 are utilized to aid in providing a gas seal by further compressing the folds in blank 10 when retaining ring 28 is secured. A metal reinforcing ring 40 shown in FIG. 5 is molded within retaining ring 28 to enhance the strength of the ring where needed.

With reference to FIGS. 6 and 7, the previously described gathering results in multiple folds of blank 11 being disposed about each stud 32 of retaining ring 28. In these figures, a section through retaining ring 44 is shown according to a second embodiment of the invention. Elements of retaining ring 44 which are identical to those described previously are identified by like reference numbers. As previously disclosed, blank 11 is typically composed of a woven nylon fabric for durability and reliability in storage as well as cost efficiency, although other known air bag materials may be alternatively employed. Woven nylon has a low melting point which in some designs would require protection from the heat typically associated with gas generation. One method of protection employs extended segments 46 molded into retaining ring 44. In an initial "open" condition, these segments 46 extend radially into retainer ring opening 30 as shown in FIG. 6. Segments 46 can be folded to effectively encase and protect gathered free edge 13. Notches 48 act as hinges to allow segment 46 to be folded so that stud shoulder section 36 snaps into hole 50. Segments 46 can further be secured with pins, or other suitable fasteners such as stitching 52.

Another scheme for protecting edge 13 is shown with reference to FIG. 8 where blank 11 is provided with a series of segments 54 extending at intervals about its free edge 13. Each extended blank segment 54 doubles back over a stud 32 to engage shoulder section 36 as depicted by the arrow. In this alternative embodiment, blank 11 employs a heat-resistant coating. The layer of a woven nylon provides protection from heat generated while providing extended durability to the bag. The coating 56, preferably of neoprene or other heat-resistant material, substantially covers the inner surface of blank 11. When extended segment 54 is doubled back allowing hole 58 to engage stud 32, the coated inner heat resistant coating 56 of blank 11 faces outwardly and effectively covers the heat sensitive area of blank 10. In a similar alternative embodiment shown in FIG. 9, an unattached section 60 of heat-resistant material, such as neoprene, encircles the blank free edge 13 and engages stud 32 by suitable means such as holes 62 before and after blank 11 is loaded onto studs 32. Section 60 is of sufficient dimension to protect free edge 13 of blank 11 from exposure to heat. Section 60 or a similar reinforcing strip could alternatively be sewn through blank 11 to provide support against lateral forces during inflation.

Figure 10:
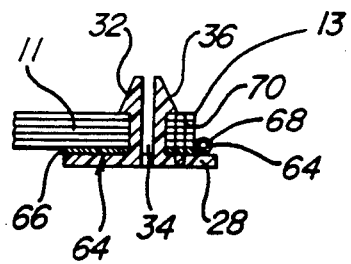
FIG. 10 is a sectional view of a single stud of a fifth embodiment of a retaining ring including a strip for providing protection of the material edge.

In still another alternative embodiment illustrated in FIG. 10, a protective strip 64 is attached to the retaining ring 28. Strip 64 includes band 66 with cord 68 placed over stud 36 and stitched to or otherwise attached to the gathered edge of material blank 11. The cord 68 is disposed adjacent to material free edge 13. Upon compression of the gathered free edge 13 when retaining ring 28 is mounted to the associated structure of the air bag assembly, cord 68 blocks the flow of hot gases from damaging gathered free edge 13. Strip 64 can alternatively be applied after blank 11 is placed on studs 32.

Figure 12:
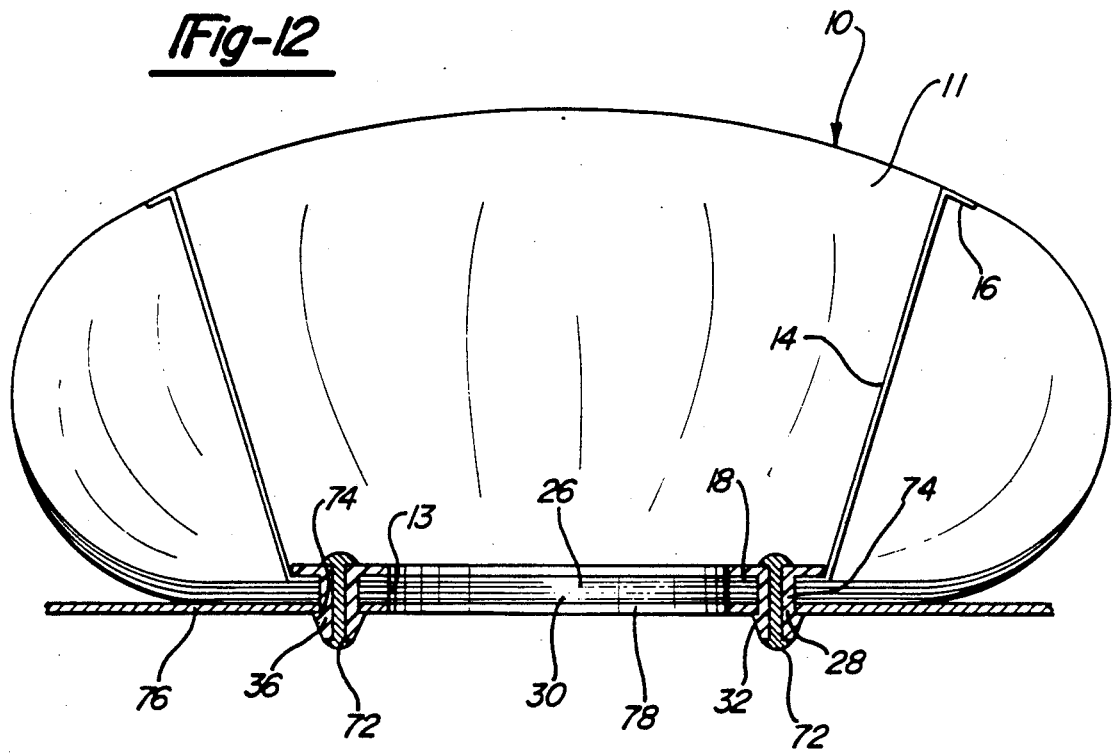
FIG. 12 is a cutaway view of the interior of a representative air bag according to this invention and associated restraint and attachment means.

FIG. 12 illustrates the air bag assembly 10 inflated to a roughly elliptical shape. Tethers 14 are connected at their end 16 to a central portion of blank 11 and the opposite tether ends 18 each engage a stud 32 and control the inflated shape of the bag.

To secure air bag 10 to the associated supporting structure, retaining ring 28 is affixed to base plate 76 by forcing studs 32 into holes 74. Rivets 72 are then disposed through studs 32 and further engage base plate 76 to secure the air bag assembly. The gas-generating apparatus is suitably disposed proximate this opening, as will be described. Preferably, retaining ring 28 is dispose proximate to the inside surface of the air bag to provide continuous pressure about the free edge 13, maintaining a sealed closure of the assembly. Base plate opening 78 is aligned with the retaining ring opening 30 and bag opening 26.

As shown in FIG. 13, gas-generator 80 with attachment plate 82 and attachment holes 84 is disposed to align with retaining ring 28. When actuated, gas output from generator 80 is conducted through a series of gas outlets 86 disposed about the outlet or nozzle 88 which protrudes into the air bag upon assembly. Alternatively, gas generator 80 may have a single outlet nozzle as is common in the prior art. Blank 11, having a diameter (or other cross-dimension in the case of an alternative non-circular blank), which is substantially larger than the diameter (or alternative major cross-dimension) of gas generator 80 and retaining ring 28, is gathered and secured about whatever type of gas generator output system is utilized.

Figure 15:
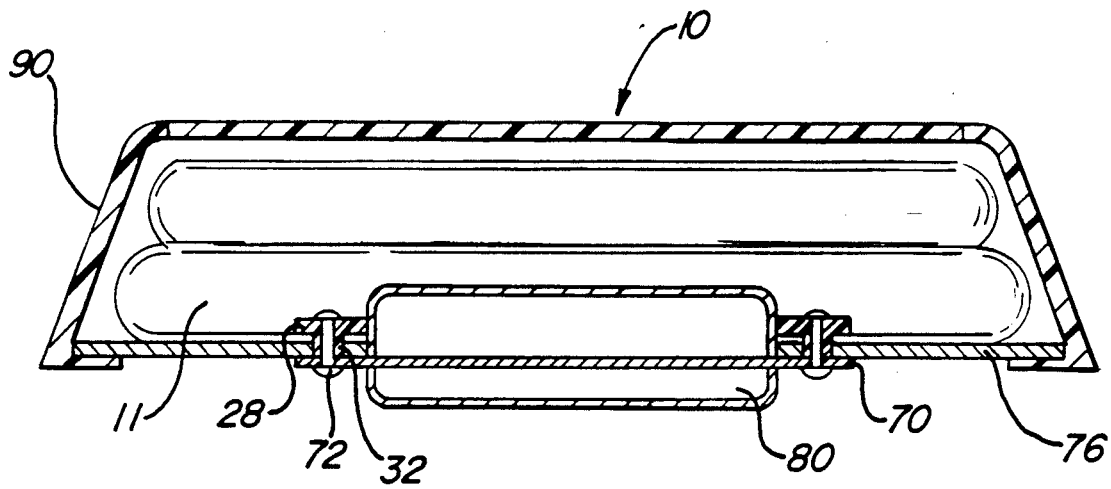
FIG. 15 is a cutaway view along line 15—15 in FIG. 14 showing the relative placement of the air bag parts when in an assembled and stored condition.

For storage, housing 90 having door 92 engages base plate 76 as shown in FIG. 15. This provides a compact enclosure for the unit in its normal condition. Anchor 94 may be used to secure the air bag assembly 10 in a suitable vehicle location, such part of the steering wheel column or dashboard of a vehicle.

FIG. 15 shows housing 90 engaging base plate 76 enclosing the folded blank 11. Retaining ring 28 attaches blank 11, base plate 76 to gas generator 80. As shown in FIG. 15, gas generator 80 may protrude into the inside of folded blank 11.

Figure 16:
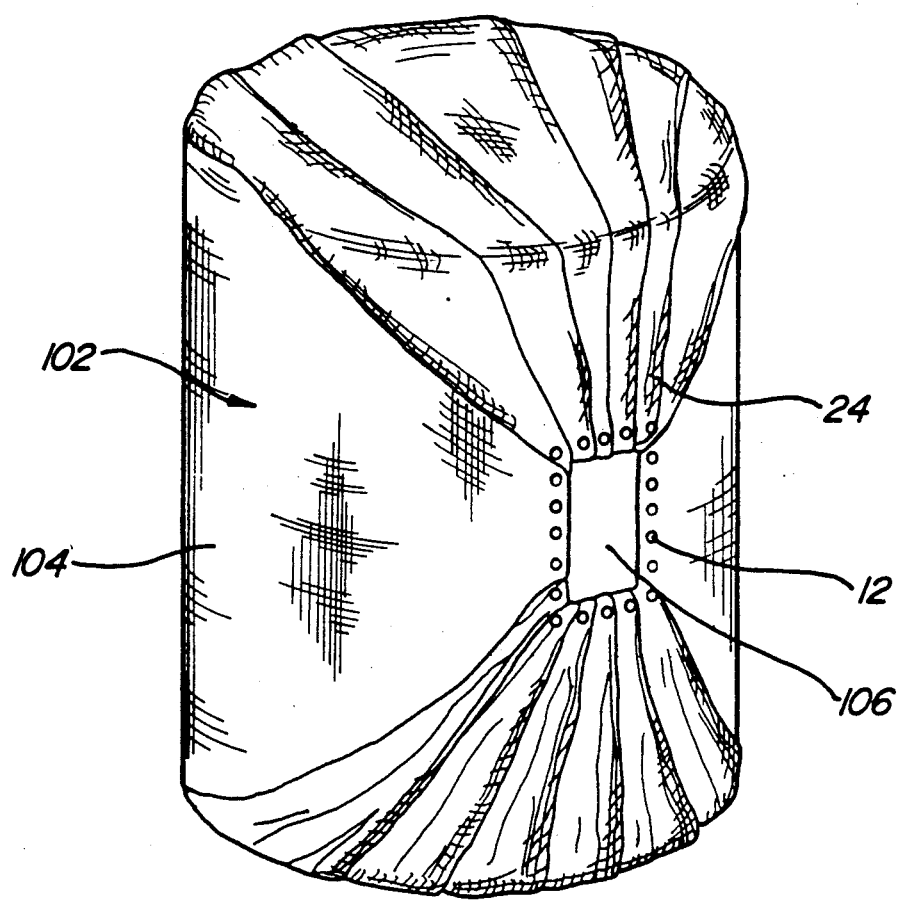
FIG. 16 is an alternative embodiment of the air bag body particularly suited for use on the passenger side of a motor vehicle.

With reference to FIG. 16, an alternate embodiment of the air bag assembly 102 is shown which utilizes a generally rectangularly shaped blank 104 which is folded to accommodate a rectangular opening 106 for the associated gas generator (not shown). Like the previous embodiments, this embodiment uses the series of apertures 12 and a specific pattern of folding blank 81 to form pleats 24. Thus, a single piece of non-contoured planar material is utilized without the necessity of seams and their inherent disadvantages. The outlet or nozzle of the gas generator (not shown) used with the bag 81 would be rectangular or a variety of other configurations. Air bag assembly 102 is shaped generally in the configuration of an elongated cylinder and is most suitable for use on the passenger side front seat area of a motor vehicle.

FIGS. 17 through 21 illustrate a third embodiment of an air bag assembly 110. Air bag assembly 110 differs from the previous embodiments with respect to the manner that free edge 13 is gathered. FIG. 17 illustrates an open arm sewing machine 112 particularly adapted for fabricating air bag assembly 110. Sewing machine 112 features an elongated generally cylindrical form 114 extending from its arm 116. Blank 11 is placed onto form 114. Sewing ring 118 is slid onto blank 11 to gather the free edge 13 as shown in FIG. 18. Thereafter, sewing machine needle 120 forms a band of stitching around the gathered edge of the blank to hold the radial pleats 24 together. In a following fabrication step, the free edge 13 of blank 11 is flared in a radially outward direction to lay flat against the planar surface of sewing ring 118. Another row of stitching (not shown) can be formed through blank 11 and sewing ring 118 to secure the blank to the sewing ring.

FIG. 20 illustrates that sewing ring 118 features a circumferentially arranged series of mounting holes 122 which are used to secure sewing ring 118 and blank 11 to the associated mounting structure which may be, for example, like that described previously. FIG. 21 shows air bag assembly 110 in an inflated condition and showing that the material edge 13 is reversely folded back onto itself. This arrangement provides excellent restraint of the air bag in response to inflation pressures.

FIGS. 22 through 25 illustrate another embodiment of an air bag assembly 130. Air bag assembly 130 utilizes an elastic cord 134 as a means for gathering free edge 13. FIG. 22 illustrates blank 11 flattened out with its outer edge 13 folded over onto itself and stitched along circle 32 to form an enclosed pocket. Elastic cord 134 is placed within the pocket and is stretched in the condition shown in FIG. 22 and is allowed to contract and gather the free edge 13. Upon contraction of elastic cord 134, the edge becomes gathered in much the way a shower cap is gathered together from a flat sheet of material. FIGS. 24 and 25 are cross-sectional views showing the elastic cord 134 gathering the free edge of material. FIG. 25 illustrates an exemplary means for attaching air bag assembly 130 to an associated structure. Elastic cord 134 is clamped between a flat retainer plate 136 and ring retainer 138. Rivet 140 attaches these two plates to clamp the air bag 130 firmly in position. A second series or rivets 142 secures both retainer plate 136 and ring retainer 138 to base plate 76. A variation of air bag assembly 130 shown in FIG. 26 employs a substantially inelastic cord or rope 144 which is used to cinch together the free edge to form radial pleats 24. Various approaches toward securing such an alternate embodiment to the associated structure could be used including that shown in FIG. 25.

FIGS. 27 through 30 illustrate air bag assembly 150 according to still another embodiment of this invention. For this embodiment, blank 11 contains a series of holes 12 arranged around the outer periphery of the bag 12 as previously discussed and described with reference to FIG. 1. Bag retainer ring 152 is provided as shown in FIG. 28 which includes two groups of apertures lying on circles of different diameters arranged circumferentially around the ring. The inner series of apertures 154 is used to engage air bag blank 11 whereas the outer series of apertures 156 is used to secure the unit to an associated structure. During assembly, a number of adjacent apertures 12 of its air bag blank are gathered together and aligned as described in conjunction with the first embodiments and rivet 158 is placed through the adjacent apertures and through one of apertures 154 to secure the air bag to retainer ring 152. All of the apertures of blank 11 are gathered in this manner to produce radial pleats 24 as described in conjunction with the first embodiment. After this step is completed, bag retainer ring 152 is fastened to attachment plate 76 which has apertures 160 for rivets 162 and further has apertures 164 to provide clearance for the protruding head of rivet 158.

FIGS. 31 and 32 show another means for fabricating an air bag assembly according to this invention which is generally designated by reference number 170. For this embodiment, the free edge 13 of air bag assembly 170 is first gathered together to form radial pleats 24 and is maintained in this condition through restraining means such as staples 172 as shown in FIGS. 31 and 32. Thereafter, as shown in FIG. 32, apertures 174 are pierced through the multiple layers of fabric. This embodiment does not require precise alignment of adjacent apertures since they are formed after the step of gathering the free edge.

FIGS. 33 and 34 illustrate various fold patterns for an air bag assembly in accordance with the prior embodiments in which varying numbers of adjacent apertures 12 are aligned onto a single retaining means such as a rivet, grommet or retaining ring post stud 32. In the embodiment shown in FIG. 33, a larger number of adjacent apertures are aligned as compared with that shown in FIG. 34.

While the above description constitutes the preferred embodiments of the present invention, it will be appreciated that the invention is susceptible of modification, variation and change without departing from the proper scope and fair meaning of the accompanying claims.

I claim:

1. An air bag passenger safety device for use in a motor vehicle having an air bag inflating apparatus comprising:

a single continuous piece of fabric material which is foldable, resists permeability of gases, and defines a perimeter edge, gathering means for gathering and supporting substantially all of said fabric perimeter edge to define an opening which is smaller in its cross-dimension than a cross-dimension of said blank before gathering thereby defining a plurality of pleats of said fabric, and mounting means for securing said air bag assembly to said vehicle such that said air bag opening is in communication with said inflating apparatus.

2. An air bag passenger safety device as set forth in claim 1 wherein said fabric is made from woven threads and has a coating of heat resistant material on at least one of its surfaces.

3. An air bag passenger safety device as set forth in claim 1 wherein said gathering means comprises a retaining ring having posts which engage apertures around the perimeter edge of said fabric.

4. An air bag passenger safety device as set forth in claim 3 wherein said retaining ring posts have an enlarged head and a slotted end enabling said head to deflect when said apertures are placed over said posts.

5. An air bag passenger safety device as set forth in claim 3 wherein said posts are hollow along their longitudinal axis and a rivet is disposed within said projection to further fasten said fabric to said retaining ring.

6. An air bag passenger safety device as set forth in claim 3 wherein said retaining ring has an opening to allow gas from said inflating apparatus to fill said air bag.

7. An air bag passenger safety device as set forth in claim 3 wherein a first group of adjacent of said air bag apertures are placed upon one of said posts and a second group of adjacent of said air bag apertures are placed upon a second of said posts.

8. An air bag passenger safety device as set forth in claim 3 wherein said retaining ring further forms a set of projections adjacent said posts to engage said fabric to aid in preventing said air bag from being withdrawn from said retaining ring.

9. An air bag passenger safety device as set forth in claim 3 wherein said retaining ring is a composite structure including a metal reinforcing ring element.

10. An air bag passenger safety device as set forth in claim 3 wherein said posts further engage a support structure for securing said air bag assembly to said motor vehicle.

11. An air bag passenger safety device as set forth in claim wherein said gathering means comprises stitching through layers of said material adjacent said free edge thereby forming said radial pleats.

12. An air bag passenger safety device as set forth in claim 11 further comprising a sewing ring having an inside opening through which said fabric passes and wherein said material adjacent said free edge is flared out and sewn to said sewing ring.

13. An air bag passenger safety device as set forth in claim 1 wherein said gathering means comprises an elastic cord passing through a pocket of said material adjacent said free edge which contracts to gather said material.

14. An air bag passenger safety device as set forth in claim 1 wherein said gathering means comprises an inelastic cord passing through a pocket of said material adjacent said free edge which can be drawn through said pocket to gather said free edge.

15. An air bag passenger safety device as set forth in claim 1 wherein said gathering means comprises a series of apertures formed around the outer periphery of said fabric blank with a grommet disposed through a plurality of adjacent of said apertures to gather said fabric.

16. An air bag passenger safety device as set forth in claim 1 wherein said gathering means comprises a retaining ring having a plurality of apertures and said blank having a plurality of apertures arranged about the perimeter edge of said blank with fastening means passing through said apertures of said retaining ring and said blank.

17. An air bag passenger safety device as set forth in claim 1 wherein said gathering means comprises staples placed through a plurality of layers of said fabric adjacent said free edge.

18. An air bag passenger safety device as set forth in claim 1 wherein said mounting comprises a retaining ring affixed to said fabric with fasteners affixing said retaining ring to a support structure of said vehicle.

19. An air bag passenger safety device as set forth in claim 1 wherein said mounting means comprises a retaining ring including a plurality of posts engaging apertures in a base plate.

20. An air bag passenger safety device as set forth in claim 19 further comprising rivets passing through longitudinal slots through said posts.

21. An air bag passenger safety device as set forth in claim 1 wherein said mounting means further secures said inflating apparatus to said vehicle.

22. An air bag passenger safety device as set forth in claim 1 wherein said mounting means comprises a ring sewn to said fabric and having a plurality of apertures for fasteners to secure said air bag to said vehicle.

23. An air bag passenger safety device as set forth in claim 1 wherein said mounting means comprises a clamping ring for retaining a cord trapped in a pocket adjacent said free edge.

24. An air bag passenger safety device as set forth in claim 1 further comprising heat protection means for shielding said gathered free edge of said fabric from hot gases from said inflating apparatus.

25. An air bag passenger safety device as set forth in claim 24 wherein said retaining means comprises a retaining ring and said heat protection means comprises a plurality of segments of said retaining ring projecting radially inwardly into the central opening of said retaining ring which can be folded back over said retaining ring to cover the radial edge of said material.

26. An air bag passenger safety device as set forth in claim 24 wherein said heat protection means comprises segments of fabric extending from said edge which can be folded back to cover the edges of said fabric after being gathered and seamed to cover the radial edges of said material.

27. An air bag passenger safety device as set forth in claim 24 wherein said heat protection means comprises a strip with a pair of radially extending flanges which contact opposite surfaces of said gathered fabric with a central portion covering said radial edge of said material.

28. An air bag passenger safety device as set forth in claim 24 wherein said heat protection means comprises a strip with a cord which is positioned along the inside edge of said gathered edge.

29. An air bag passenger safety device as set forth in claim 1 further comprising one or more tether straps having one end attached to said blank near the center of said blank and at the opposite end adjacent said opening to modify the shape of said air bag when inflated.

30. An air bag passenger safety device as set forth in claim 1 wherein said blank is circular.

31. An air bag passenger safety device as set forth in claim wherein said blank is rectangular and forms a cylindrically shaped inflated air bag.

32. An air bag passenger safety device for use in a motor vehicle having an air bag inflating apparatus comprising:
   a single continuous piece of fabric material which is foldable, resists permeability of gases, and defines a perimeter edge,
   said fabric material defining plurality of apertures adjacent its outer peripheral edge, and
   a retainer ring element with a central opening and having a plurality of posts, each of said posts receiving two or more of said apertures whereby said ring element gathers said fabric perimeter edge thereby defining a plurality of pleats of said fabric.

33. An air bag passenger safety device as set forth in claim 32 wherein said ring element is fastened to a support structure thereby securing said air bag assembly to said vehicle.

34. An air bag passenger safety device as set forth in claim 32 wherein said retaining ring posts have an enlarged head and a slotted end enabling said head to deflect when said apertures are placed over said posts.

35. An air bag passenger safety device as set forth in claim 32 wherein said posts are hollow along their longitudinal axis and a rivet is disposed within said projection to further fasten said fabric to said retaining ring.

36. An air bag passenger safety device as set forth in claim 32 wherein a first group of adjacent of said air bag apertures are placed upon one of said posts and a second group of adjacent of said air bag apertures are placed upon a second of said posts.

37. An air bag passenger safety device as set forth in claim 32 wherein said retaining ring further forms a set of projections adjacent said posts to engage said fabric to aid in preventing said air bag from being withdrawn from said retaining ring.

38. An air bag passenger safety device as set forth in claim 32 wherein said retaining ring is a composite structure including a metal reinforcing ring element.

39. An air bag passenger safety device as set forth in claim 32 wherein said retaining ring further defines a plurality of segments projecting radially inwardly into the central opening of said retaining ring which can be folded back over said retaining ring to cover the radial edge of said material.

40. An air bag passenger safety device as set forth in claim 32 further comprising rivets passing through longitudinal slots through said posts.

41. An air bag passenger safety device as set forth in claim 32 further comprising heat protection means for shielding said gathered free edge of said fabric from hot gases from said inflating apparatus.

42. An air bag passenger safety device as set forth in claim 32 wherein said blank is circular.

43. An air bag passenger safety device as set forth in claim 32 wherein said blank is rectangular and forms a cylindrically shaped inflated air bag.

44. An air bag passenger safety device for use in a motor vehicle having an air bag inflating apparatus comprising:
   a single continuous piece of fabric material which is foldable and resists permeability of gases and defines a perimeter edge,
   a cord passing through a pocket of fabric formed along the perimeter edge of said fabric and causing said fabric to be gathered at said edge to define radial pleats and defining an opening which is smaller in its cross-dimension than the cross-dimension of said blank.

45. An air bag passenger safety device as set forth in claim 44 wherein said cord is elastic.

46. An air bag passenger safety device as set forth in claim 44 wherein said cord is inelastic.

47. An air bag passenger safety device as set forth in claim 44 further comprising mounting means for clamping against said pocket around said cord for securing said air bag to said vehicle.

48. An air bag passenger safety device for use in a motor vehicle having an air bag inflating apparatus comprising:
   a single continuous piece of fabric material which is foldable, resists permeability of gases, and defines a perimeter edge,
   a sewing ring having a central aperture through which substantially all of the perimeter edge of said fabric passes, said central aperture having a cross-dimension less than all the cross-dimensions of said fabric whereby said fabric is gathered before folding forming radial pleats when placed through said central aperture and said sewing ring supporting substantially all of said perimeter edge.

49. An air bag passenger safety device as set forth in claim 48 wherein said fabric is sewn to said securing ring.

50. An air bag passenger safety device as set forth in claim 48 wherein said sewing ring defines a plurality of mounting apertures for fastening said ring to said vehicle.

51. A method of fabricating an air bag passenger safety device for use in a motor vehicle having an air bag inflating apparatus comprising:
   providing a single continuous piece of fabric material which is foldable and resists permeability of gases and defines a perimeter edge,
   gathering said fabric together along substantially all of said edge to define a plurality of radial pleats and defining an opening for inflating gases from said inflating device which is smaller in its cross-dimension than a cross-dimension of said blank, and
   providing means for mounting said air bag such that said opening is in fluid communication with said inflating apparatus.

52. A method of fabricating an air bag passenger safety device as set forth in claim 51 further comprising piercing a plurality of mounting holes through said fabric after said gathering.

53. An air bag passenger safety device for use in a motor vehicle having an air bag inflating apparatus comprising:
   a single continuous piece of fabric material which is foldable, resists permeability of gases, and defines a perimeter edge,
   a retaining ring for gathering said fabric perimeter edge to define an opening which is smaller in its cross-dimension than the cross-dimension of said blank before gathering thereby defining a plurality of pleats of said fabric, said retaining ring having posts which engage apertures around the perimeter edge of said fabric wherein a first group of adjacent of said air bag apertures are placed upon one of said posts and a second group of adjacent of said air bag apertures are placed upon a second of said posts, and mounting means for securing said air bag assembly to said vehicle such that said air bag opening is in communication with said inflating apparatus.

54. An air bag passenger safety device for use in a motor vehicle having an air bag inflating apparatus comprising:
a single continuous piece of fabric material which is foldable, resists permeability of gases, and defines a perimeter edge,
a retaining ring for gathering said fabric perimeter edge to define an opening which is smaller in its cross-dimension than the cross-dimension of said blank before gathering thereby defining a plurality of pleats of said fabric, said retaining ring having posts which engage apertures around the perimeter edge of said fabric and forming a set of projections adjacent said posts to engage said fabric to aid in preventing said air bag from being withdrawn from said retaining ring, and
mounting means for securing said air bag assembly to said vehicle such that said air bag opening is in communication with said inflating apparatus.

55. An air bag passenger safety device for use in a motor vehicle having an air bag inflating apparatus comprising:
a single continuous piece of fabric material which is foldable, resists permeability of gases, and defines a perimeter edge,
a sewing ring for gathering said fabric perimeter edge to define an opening which is smaller in its cross-dimension than the cross-dimension of said blank before gathering thereby defining a plurality of pleats of said fabric, said sewing ring having an inside opening through which said fabric passes and wherein said material adjacent said free edge is flared out and stitching through layers of said material adjacent said free edge and through said sewing ring to form said radial pleats, and
mounting means for securing said air bag assembly to said vehicle such that said air bag opening is in communication with said inflating apparatus.

56. An air bag passenger safety device for use in a motor vehicle having an air bag inflating apparatus comprising:
a single continuous piece of fabric material which is foldable, resists permeability of gases, and defines a perimeter edge,
an elastic cord for gathering said fabric perimeter edge to define an opening which is smaller in its cross-dimension than the cross-dimension of said blank before gathering thereby defining a plurality of pleats of said fabric, said elastic cord passing through a pocket of said material adjacent said free edge which contracts to gather said material, and
mounting means for securing said air bag assembly to said vehicle such that said air bag opening is in communication with said inflating apparatus.

57. An air bag passenger safety device for use in a motor vehicle having an air bag inflating apparatus comprising:
a single continuous piece of fabric material which is foldable, resists permeability of gases, and defines a perimeter edge,
an inelastic cord for gathering said fabric perimeter edge to define an opening which is smaller in its cross-dimension than the cross-dimension of said blank before gathering thereby defining a plurality of pleats of said fabric, said inelastic cord passing through a pocket of said material adjacent said free edge which can be drawn through said pocket to gather said free edge, and
mounting means for securing said air bag assembly to said vehicle such that said air bag opening is in communication with said inflating apparatus.

58. An air bag passenger safety device for use in a motor vehicle having an air bag inflating apparatus comprising:
a single continuous piece of fabric material which is foldable, resists permeability of gases, and defines a perimeter edge,
a ring sewn to said fabric for gathering said fabric perimeter edge to define an opening which is smaller in its cross-dimension than the cross-dimension of said blank before gathering thereby defining a plurality of pleats of said fabric, said ring having a plurality of apertures for fasteners to secure said air bag to said vehicle, and
mounting means for securing said air bag assembly to said vehicle such that said air bag opening is in communication with said inflating apparatus.

59. An air bag passenger safety device for use in a motor vehicle having an air bag inflating apparatus comprising:
a single continuous piece of fabric material which is foldable, resists permeability of gases, and defines a perimeter edge,
a clamping ring and a retainer and a cord trapped into a pocket adjacent said free edge for gathering said fabric perimeter edge to define an opening which is smaller in its cross-dimension than the cross-dimension of said blank before gathering thereby defining a plurality of pleats of said fabric, and
mounting means for securing said air bag assembly to said vehicle such that said air bag opening is in communication with said inflating apparatus.

60. An air bag passenger safety device for use in a motor vehicle having an air bag inflating apparatus comprising:
a single continuous piece of fabric material which is foldable, resists permeability of gases, and defines a perimeter edge,
a retaining means for gathering said fabric perimeter edge to define an opening which is smaller in its cross-dimension than the cross-dimension of said blank before gathering thereby defining a plurality of pleats of said fabric,
heat protection means for shielding said gathered free edge of said fabric from hot gases from said inflating apparatus, said heat protection means including a plurality of segments of said retaining ring projecting radially inwardly into the central opening of said retaining ring which can be folded back over said retaining ring to cover the radial edge of said material, and
mounting means for securing said air bag assembly to said vehicle such that said air bag opening is in communication with said inflating apparatus.

61. An air bag passenger safety device for use in a motor vehicle having an air bag inflating apparatus comprising:
a single continuous piece of fabric material which is foldable, resists permeability of gases, and defines a perimeter edge, gathering means for gathering said fabric perimeter edge to define an opening which is smaller in its cross-sectional dimension than the cross-sectional dimension of said blank before gathering thereby defining a plurality of pleats of said fabric, heat protection means for shielding said gathered free edge of said fabric from hot gases from said inflating apparatus, said heat protection means including segments of fabric extending from said edge which can be folded back to cover the edges of said fabric after being gathered and seamed to cover the radial edges of said material, and mounting means for securing said air bag assembly to said vehicle such that said air bag opening is in communication with said inflating apparatus.

62. An air bag passenger safety device for use in a motor vehicle having an air bag inflating apparatus comprising:

a single continuous piece of fabric material which is foldable, resists permeability of gases, and defines a perimeter edge, gathering means for gathering said fabric perimeter edge to define an opening which is smaller in its cross-dimension than the cross-dimension of said blank before gathering thereby defining a plurality of pleats of said fabric, heat protection means for shielding said gathered free edge of said fabric from hot gases from said inflating apparatus, said heat protection means including a strip with a pair of radially extending flanges which contact opposite surfaces of said gathered fabric with a central portion covering said radial edge of said material, and mounting means for securing said air bag assembly to said vehicle such that said air bag opening is in communication with said inflating apparatus.

63. An air bag passenger safety device for use in a motor vehicle having an air bag inflating apparatus comprising:

a single continuous piece of fabric material which is foldable, resists permeability of gases, and defines a perimeter edge, gathering means for gathering said fabric perimeter edge to define an opening which is smaller in its cross-dimension than the cross-dimension of said blank before gathering thereby defining a plurality of pleats of said fabric, heat protection means for shielding said gathered free edge of said fabric from hot gases from said inflating apparatus, said heat protection means including a strip with a cord which is positioned along the inside edge of said gathered edge, and mounting means for securing said air bag assembly to said vehicle such that said air bag opening is in communication with said inflating apparatus.

64. An air bag passenger safety device for use in a motor vehicle having an air bag inflating apparatus comprising:

a single continuous piece of fabric material which is foldable, resists permeability of gases, and defines a perimeter edge, gathering means for gathering said fabric perimeter edge to define an opening which is smaller in its cross-dimension than the cross-dimension of said blank before gathering thereby defining a plurality of pleats of said fabric, mounting means for securing said air bag assembly to said vehicle such that said air bag opening is in communication with said inflating apparatus, and one or more tether straps having one end attached to said blank near the center of said blank and at the opposite end adjacent said opening to modify the shape of said air bag when inflated.

* * * * *

UNITED STATES PATENT AND TRADEMARK OFFICE
CERTIFICATE OF CORRECTION

PATENT NO. : 4,988,119

DATED : January 29, 1991

INVENTOR(S) : James Hartmeyer

It is certified that error appears in the above-identified patent and that said Letters Patent is hereby corrected as shown below:

Column 9, line 48, claim 11, after the word "claim" insert --1--.

Column 10, line 15, claim 18, after the word "mounting" insert --means--.

Column 11, line 4, claim 31, after the word "claim" insert --1--.

Signed and Sealed this

Thirtieth Day of June, 1992

Attest:

DOUGLAS B. COMER

Attesting Officer

Acting Commissioner of Patents and Trademarks